Figure 1:
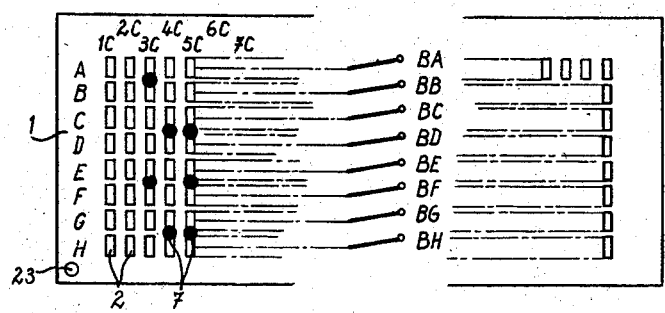

June 23, 1959   P. A. DESCOUVEMONT   2,892,048
TABULATOR COMMUTATORS FOR RECORDING AND THE LIKE MACHINES
Filed July 24, 1956   3 Sheets-Sheet 1

United States Patent Office

2,892,048
Patented June 23, 1959

2,892,048

TABULATOR COMMUTATORS FOR RECORDING AND THE LIKE MACHINES

Pierre André Descouvemont, Bourg la Reine, France, assignor to Compagnie des Machines Bull (Societe Anonyme), Paris, France Application July 24, 1956, Serial No. 599,777

Claims priority, application France August 2, 1955

10 Claims. (Cl. 200—46)

This invention relates to a tabulator commutator for recording machines having a carriage, such as typewriters, accounting machines, record card punching machines or like machines. The invention concerns more particularly an electric commutator or distributor associated with the tabulating mechanism of the carriage of the machine for the transmission, in the form of current pulses, of drive, control or recording indications, corresponding respectively to the successive recording positions of said carriage. Such tabulator commutators are known which comprise a support provided with rows of contact studs which are explored by contact wipers moved relative to said studs in relation to the movements of the carriage of the machine. Electrical connections, previously established between the studs of said commutator by means of plug-in connections, detachable clips or other like means of connection establish electrical connections which determine the current pulses transmitted by the commutator to different recording positions. However, in order to carry out other work, these connections have to be modified to comply with new operating conditions of the machine and to transmit different indications. This introduces risks of errors and trials are sometimes necessary to obtain the desired result. To remedy these disadvantages, it has been proposed to utilise detachable commutator plates provided with sockets for receiving plug-in connections. The plates being interchangeable, it was possible to prepare them in advance by providing them with suitable plug-in connections before introducing them into the machine. These plates, however, were expansive and bulky.

The present invention has the object of providing a tabulator commutator which remedies the said disadvantages and which comprises a readily interchangeable support which, instead of plug-in connections, comprises contact studs connected selectively together by permanent electrical connections, such as soldered joints or like contact means.

According to one embodiment of the invention, said support comprises a detachable insulating plate on which contact surfaces, constituted by conducting surfaces of printed circuits, are arranged in the form of rows of contacts separated by small non-conducting surfaces. Permanent electrical connections, for the indications to be transmitted in the form of pulses by said commutator to different positions of the carriage, are provided by the application of a conducting material between the adjacent conducting surfaces at selected places of said support. This conducting material, during the exploration of the contact surfaces by the brushes or wipers of said commutator, close circuits or predetermined combinations of circuits for the transmission of pulses corresponding to the indications pertaining to the different positions of record columns of the machine explored by the wipers of the commutator.

Figure 2:
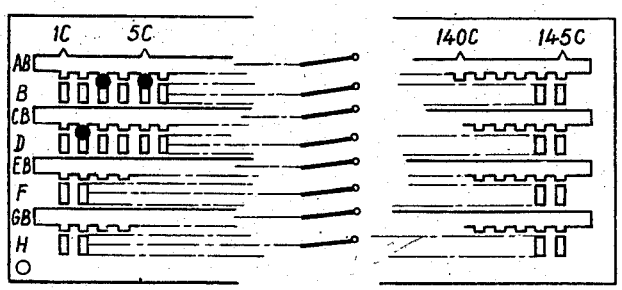
Figure 3:
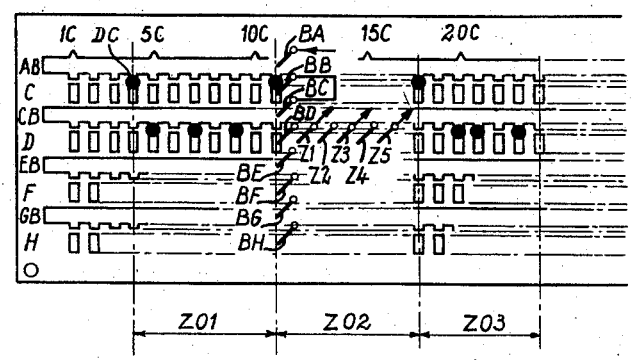
Figure 4:
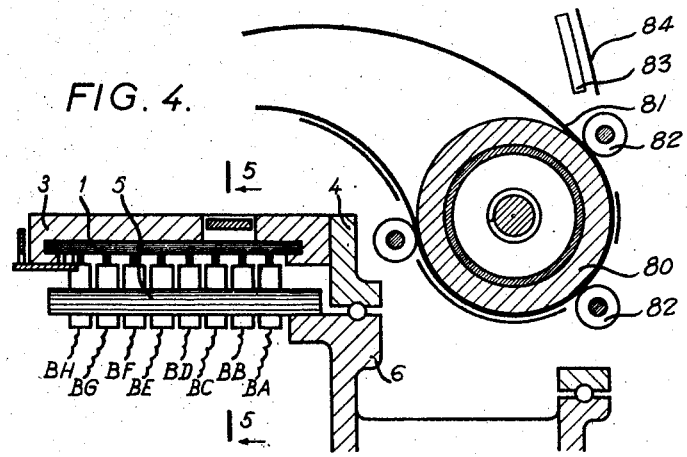
Figure 5:
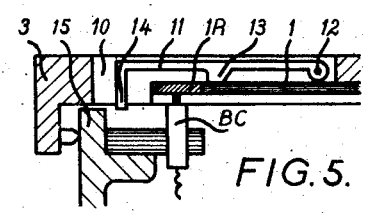
Figure 6:
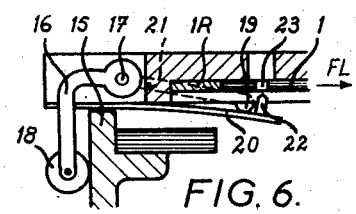
Figure 7:
Figure 9:
Figure 8:
Figure 10:
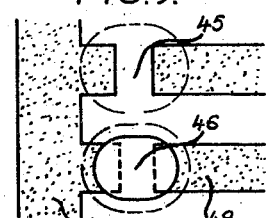
Figure 11:
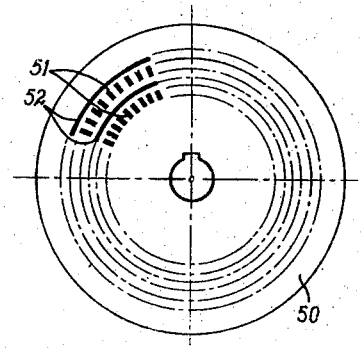
Figure 14:
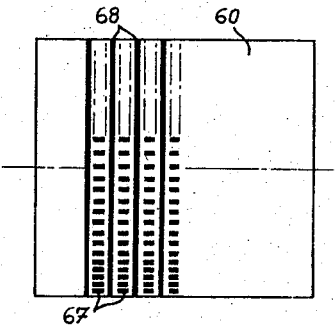
Figure 12:
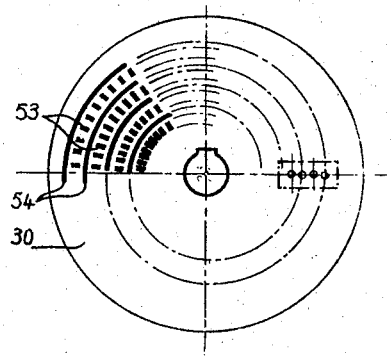
Figure 15:
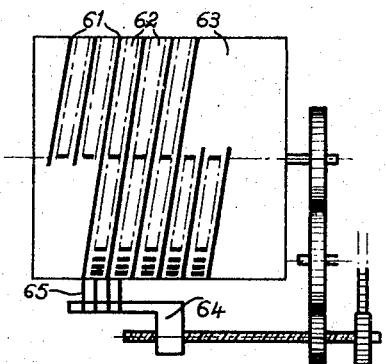
Figure 13:
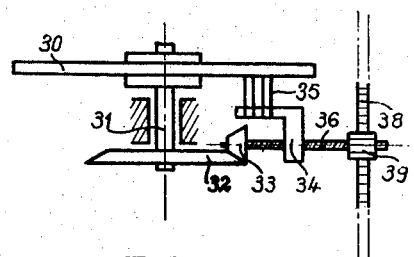
Figure 16:
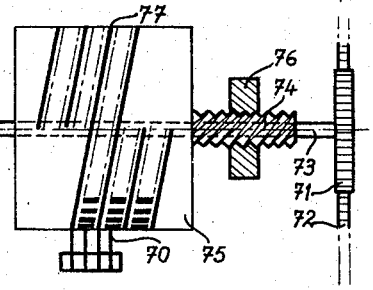

Other advantages and features of the invention will appear more clearly during the course of the following description and with reference to the examples illustrated diagrammatically in the accompanying drawings, in which:

Figure 1 shows a simplified form of a detachable support provided with rows of contacts, and illustrates diagrammatically the arrangement of the wipers of a tabulator commutator, Figure 2 shows a detachable support provided with rows of contacts and longitudinal contact strips, and illustrates diagrammatically an arrangement of wipers for exploring said contacts and contact strips, Figure 3 shows a detachable support with an arrangement of wipers different from that of Figures 1 and 2, Figure 4 is a sectional view of the carriage of an accounting machine provided with a tabulator commutator according to the invention, Figure 5 is a part sectional view, on the line 5—5 of the commutator shown in Figure 4, Figure 6 is a sectional view of a locking and unlocking device for the detachable support of a tabulator commutator, Figure 7 is a sectional view on a large scale through a deposit of conducting material applied to a support, Figure 8 shows a modification of Figure 7 with incrusted printed circuit elements, Figure 9 shows a modification of Figure 8, in which the conducting material forming the electrical connection is applied in a cavity provided in the support for that purpose, Figure 10 is a plan of the parts shown in Figure 9, Figure 11 shows a modification comprising a detachable support in the form of a disc with rows of contacts and contact strips arranged in concentric circles, Figure 12 shows another modification comprising a detachable support in the form of a disc with rows of contacts and contact strips arranged in spirals, Figure 13 shows diagrammatically a mechanical device associated with a commutator wiper holder for the utilisation of a contact support constructed according to Figure 12, Figure 14 shows another modification comprising a detachable support in the form of a cylinder carrying rows of contact and contact strips arranged on parallel circumferences, Figure 15 shows another modification comprising a detachable contact support in the form of a cylinder carrying rows of contacts and contact strips arranged on its periphery along parallel helixes, and Figure 16 shows a modification of the device shown in Figure 15.

The detachable contact support for a tabulator commutator shown in Figure 1 is formed by an insulating plate 1, on which conducting surfaces or contacts 2 are arranged in rows A, B . . . G, H, the said conducting surfaces being also arranged in numbered columns 1C, 2C, 3C . . . each corresponding to a recording column position of the machine.

The support according to one of the modifications of Figures 1, 2 or 3 is fixed on the movable carriage 4, Figure 4, of an accounting machine by introducing the support into the slideways of a slide piece 3 integral with the carriage. The contacts of the detachable support are explored or wiped by exploring wipers or brushes BA, BB . . . BH, held in an insulating part 5 mounted on the fixed frame 6 of the machine in such a manner that said exploring wipers are brought into simultaneous contact with all the contacts of a column of the commutator.

The carriage 4 is provided with a platen 80 carrying a sheet of paper 81 held by rollers 82. A fixed support 83 arranged above the platen carries an indicator strip in front of which moves an index 84 fixed to the carriage and showing at any moment the indications corresponding to the position of said carriage. The support may carry on one face or on both faces contact combinations corresponding to several series of contact combinations. In this case, electrical commutation means, not shown, may be provided to permit the use of one or the other of different series of indications each corresponding to a working programme of the machine by bringing into connection devices utilising the said indications with certain groups of exploring wipers or with other groups according to the programme selected.

The support 1 of Figure 1 shows in the form of patches 7 deposits of conducting material forming permanent electrical connections applied between the contacts of different rows. This conducting material may be formed, for example, of a conducting ink, for which numerous formulae are known, or again may be formed by solder applied at a low temperature. In column 5C there are shown two contacts respectively of rows C and D, two contacts of rows E and F and two contacts of rows G and H connected together by deposits of conducting material.

In these conditions, when the carriage of the machine is stopped in the recording position, for which the exploring wipers are in contact with the contacts of column 5C, the deposits of conducting material applied between the aforesaid contacts connect electrically together the wipers BC and BD, BE and BF and the wipers BG and BH. These electrical connections may, as stated, be used for transmitting, either to different members of the machine or to members of other machines connected to said machine or to remote control or recording lines, current pulses for effecting a control, an order or a recording, determined by the conducting deposits applied between the selected contacts of the column explored.

Since the invention is limited to the commutator, no mention will be made of the various possible uses of the circuits which may thus be established.

The exploring wipers are preferably arranged in such a manner that they do not come into contact with the deposits of conducting material, so that this deposit will not be damaged by rubbing against said wipers.

In the construction of the contact support shown in Figure 2, the rows of contacts A, C, E and G of Figure 1 have been replaced by conducting strips AB, CB, EB and GB, this having been done because for certain applications, it is not necessary to break the contact between the contacts for one of the two wipers which have to be connected together by the selectively applied material; this reduces the wear of said wiper.

In the example of Figure 2, the contacts of the commutator being explored column by column, it is possible to transmit pulses corresponding to particular indications or to establish particular circuits for each recording column of the machine; in certain cases of application, however, it is adequate to transmit only for recording zones each comprising several columns, pulses corresponding to zone indications, which may possibly be associated with column indications. In Figure 3, pulses corresponding to zone indications may be transmitted for the zones ZO1, ZO2, ZO3 in the positions of recording columns 4C, 11C and 18C. The pulses thus transmitted may drive recording devices or simply control in the machine the jump from one recording zone to another or control the jump or arrestment of the carriage at a predetermined column. It is, however, likewise possible at a predetermined column position of a recording zone comprising several columns, when one or more supplementary rows of exploring wipers are provided, to explore simultaneously the contacts corresponding to different recording columns of the machine. Thus in addition to the wipers BA, BB, BC, BD, BE ... exploring the different rows of contacts (and conducting strips) in a recording column, there may be provided, as shown in Figure 3, one or more supplementary rows of wipers Z1, Z2, Z3, Z4, Z5.

In the example of Figure 3, the recording zone ZO1 is signalled by indications determined by deposits of conducting material respectively applied as follows: a conducting deposit D.C. forming electrical connection between the conducting strip AB and the adjacent contact in the row C of the recording column 4C, and deposits of conducting material applied between the conducting strip CB and the contacts of the row D corresponding respectively to the recording columns 5C, 7C and 9C. The wiper BA being connected in circuit and an electrical connection being established between the wipers BB and BC, when the carriage of the machine passes to the recording position corresponding to the recording column 4C, the current supplied by the wiper BA to the conducting strip AB passes via the conducting deposit DC, wiper BB, wiper BC, conducting strip CB and the conducting deposits applied between the conducting strip CB and the contacts of the row D to the wipers Z1, Z3 and Z5 and then to the utilisation circuits. It will be appreciated that such a commutator permits of a considerable number of constructional modifications. The electrical connections between the contacts being established for each contact support in a manner corresponding to the carrying out of a predetermined work of the machine, provision has been made for the interchangeability of said contact supports. For this purpose, the slide piece 3, Figure 5, which is integral with the movable carriage of the machine is provided with an opening 10 in which is mounted a carriage lock, comprising a latch 11 oscillating about a pivot 12. The latch is provided with a ramp 13 normally bearing against the support 1 when it is in place. The carriage being shown pushed home to the right, the exploring wipers BA to BH, Figure 1 bear on an insulating rest plate 1R, Figure 5. The carriage being in this position, the support 1 may be removed from its slide by drawing it to the right, the latch 11 of the lock drops and the nose 14 takes up a position in front of a boss 15 integral with the frame of the machine, and prevents the return of the carriage to the left, thus maintaining the exploring wipers against the insulating rest plate 1R. Figure 6 shows a locking system for the support 1, associated with the preceding device and permitting the latter to be withdrawn and of course replaced by another, on condition however that the exploring wipers are first brought to the rest position shown in Figure 5. In the example shown in Figure 6, a lever 16 pivoting with a spindle 17 is provided with a roller 18 which, when the carriage is pushed home to the right, bears against the boss 15 integral with the machine frame. A lever 21 likewise integral with the shaft 17 is provided with a finger 19 which bears on a spring 20 (for clarity of drawing, the exploring wipers are not shown in Figure 6). The spring 20 is provided with a stud 22 normally engaged in the hole 23 of a support 1. For the extreme right-hand position of the carriage shown in Figure 6, the exploring wipers are held on the insulating rest place 1R and the detachable contact support may be removed from its slide in the direction of the arrow FL, since the stud 22 is disengaged from the hole 23. The introduction of a fresh contact support raises the latch 11 of Figure 5, which permits the carriage to be returned to hte left, this movement releasing the spring 20 from the action of the finger 19 and the stud 22 enters the hole 23 for locking the detachable support in its slide.

Figure 7 shows a view in section of a deposit of conducting material 40 applied to printed circuits 41 in relief on a detachable support plate 42.

The printed circuits 43, Figure 8, are either fixed by the application of a filling 44 of supplementary insulating material bringing the contact surfaces and the surface of the support the same level, or are incrusted by the application of pressure and heat in a support of thermoplastic material. Since the exploring wipers do not then have to move from one plane to another during the movement of the support, they are in the best service conditions.

Figures 9 and 10 show a feature of the invention, according to which by previous moulding of the support or by moulding during the incrustation of the circuits, cavities 45 are provided in said support at the places where the conducting material 46 may possibly be applied to form electrical connections between the circuit elements 47 and 49. The conducting material thus applied, especially when it is conducting ink, should be applied with a certain thickness; furthermore, some inks are brittle when rubbed, and the conducting material thus applied and projecting may be damaged by external mechanical actions. Due to the cavities 45 provided in the detachable supports, the latter may be stacked or slipped against each other without disadvantage for the deposits of conducting material which are thus protected from rubbing. It is evident that the detachable supports may have any form deemed suitable and best adapted according to the cases of application.

In Figure 11, the contacts of a commutator are shown arranged on a detachable support 50 in the form of a disc, the rows of contact 51 and contact strips 52 being arranged in concentric circles. In Figure 12, the contact rows and conducting strips 54 are arranged along spirals; this arrangement may be necessary for machines in which a commutator has to be provided with very long rows of contacts, whilst remaining of relatively small bulk. Figure 13 shows diagrammatically a commutator device using a contact support constructed according to Figure 12. The disc 30 is detachably mounted on a spindle 31 provided with a bevel wheel 32 meshing with a bevel pinion 33. The carriage 34 carrying the exploring wipers 35 is moved in front of the disc 30 by the rotation of a screw 36 driven by a pinion 39 meshing with a rack 38 integral with the carriage of the machine. A device of this kind may be mounted on the side of the frame of a long carriage machine. In Figure 14, a detachable contact support 60 has the form of a cylinder or drum, carrying rows of contacts 67 and contact strips 68. This arrangement is provided more particularly for reproducing punching machines or the like, in which there has already been provided a drum programme device for transmitting particular indications to different recording columns of the machine. In Figure 15, the contact strips 61 and rows of contacts 62 are arranged helically on a drum 63. As for Figure 13 a screw carriage mechanism 64 is provided in this case for moving the exploring wipers 65 of the commutator contacts parallel to the axis of the cylinder.

In the solution shown in Figure 16, which is equivalent to that shown in Figure 15, the exploring wipers 70 are fixed, the drum 75 is driven by a pinion 71 meshing with a rack 72 integral with the machine carriage. The drum 75 is splined on a shaft 73 keyed to the pinion 71 and is integral with a screw 74, threaded in a fixed nut 76 having the same pitch as the helix 77, on which are distributed the contacts and contact strips of the commutator, which move in front of the exploring wipers 70, in relation with the movements of the machine carriage.

In the examples described, the contact support moves past exploring wipers, but a device will be considered analogous in which the wipers move over the support or when both are given combined relative movements as in Figures 13 and 15.

The constructional examples described are by no means restrictive, and any modifications of form and adaptations may be established according to the cases and applications without departing from the spirit of the invention.

I claim:

1. A tabulator commutator for recording machines equipped with a carriage adapted to be displaced with respect to a support fixed in said machine into a plurality of recording positions comprising, in combination, a detachable insulating plate fastened upon said carriage and having electric current conducting contact surfaces constituted by thin conductive layer arranged on one face of said plate separated one from another by non-conducting surfaces, adjacent contact surfaces in selected positions being electrically connected by deposits of conducting material applied between aforesaid adjacent contact surfaces, at least a pair of contact members fixed on said support and adapted for rubbing against said insulating plate in such a manner that for each determined recording position of said carriage one of said members belonging to said pair makes contact with a first one of said contact surfaces whereas the other member makes contact with a second one of said contact surfaces, and electrical connections connected to said members, said members of anyone of said pairs being adapted for carrying electric currents when, in a recording position of said carriage, said members make contact with a said first and a said second contact surface connected together by said deposit material.

2. In combination with a tabulator as set forth in claim 1, a slide in said machine for receiving said insulating plate, a latch in connection with said slide to maintain said insulating plate in said slide in such a manner that said insulating plate cannot be detached from said slide, and means operable only in a determined rest position of said carriage to unlock said latch so that said insulating plate may be detached.

3. In combination with a tabulator as set forth in claim 2, an insulating rest plate fixed in said machine and adapted to be contacted by said first contact members when said carraige is in said rest position.

4. A tabulator commutator for carriage equipped recording and like machines, comprising, in combination, a detachable insulating element, driving means comprising an axis for rotating said element about said axis in synchronism with the movement of said carriage, a pair of lines arranged concentrically about said axis on said insulating member, electric current conducting contact surfaces arranged on a first line of said pair of lines, the contact surfaces on said first line being distanced from each other according to the distance between the different recording positions of said carriage, deposits of conducting material applied between selected ones of said contact surfaces on said first line and adjacent contact surfaces on the second line of said pair of lines, a pair of contact members, the first one of said members being adapted to make contact with a different one of the contact surfaces of said first line for each different recording position of said carriage, the second one of said members being adapted to make contact with a contact surface situated on said second line and adjacent to the contact surface contacted by said first contact member, and electrical connections connected to said contact members and adapted to transmit current when said contact members make contact with contact surfaces connected together by said deposit material.

5. A tabulator commutator for carriage equipped recording and like machines comprising, in combination, a stationary frame, an axle mounted on said frame, a detachable insulating element mounted on said axle, driving means for rotating said insulating element on said axle in synchronism with the movement of said carriage, electric current conducting surfaces arranged on a pair of parallel spiral lines on said element, a first line of said pair of lines comprising contact surfaces separated one from the other by non-conducting surfaces, deposits of conducting material applied between selected ones of said contact surfaces of said first line and an adjacent contact surface of said second line, a support fixed in said machine, a pair of contact members fixed on said support and adapted to make contact with the contact surfaces of said pair of parallel lines, displacing means to displace said support in a direction substantially perpendicular to said lines when said carriage is moved, such that the contact members contact with a different contact surface of said first line and a contact surface of the second line for each different recording position of the carriage, and electric connections connected to said contact members and adapted to transmit current when both said contact members make contact with contact surfaces connected by said deposit material.

6. A tabulator commutator as set forth in claim 1, in which said detachable insulating element is provided with cavities at the places where said conducting material is or may be applied between adjacent contact surfaces.

7. A tabulator commutator as set forth in claim 1, in which said contact members are adapted to make contact with contact surfaces connected together by said deposits of conducting material without touching said deposits.

8. A tabulator commutator as set forth in claim 1, in which said conducting contact surfaces of said insulating plate are arranged in rows comprising each a plurality of pairs of adjacent conducting contact surfaces, the contact surfaces of each pair of contact surfaces of a row being contacted by a corresponding pair of contact members.

9. A tabulator commutator for a recording machine equipped with a carriage adapted to be displaced with respect to a support fixed in said machine into a plurality of recording positions, comprising a detachable insulating plate fastened upon said support, electric current conducting contact surfaces constituted by thin conductive layers arranged on a face of said insulating plate, insulating surfaces separating the contact surfaces, deposits of conducting material between the aforesaid adjacent contact surfaces to electrically connect pairs of adjacent contact surfaces in selected positions, at least one pair of contact members fastened upon said carriage for rubbing against said insulating plate so that, for each determined recording position of said carriage, the members belonging to said one pair of contact members make contact each with a corresponding one of said contact surfaces of a determined pair, and electrical connections connected to said members, said members of said one pair being adapted for carrying electric currents when, in a recording position of said carriage, said members make contact with a pair of contact surfaces the contact surfaces of which are connected together by said deposit material.

10. A tabulator commutator for recording machines equipped with a carriage adapted to be displaced with respect to a support fixed in said machine into a plurality of recording positions comprising, in combination, a detachable insulating plate fastened upon said carriage and having electric current conducting contact surfaces constituted by thin conductive layers arranged on two opposite faces of said plate separated on each face one from another by non-conducting surfaces, adjacent contact surfaces in selected positions on at least one face being electrically connected by deposits of conducting material applied between aforesaid adjacent contact surfaces, at least a pair of contact members fixed on said support and adapted for rubbing against one of said faces of said insulating plate in such a manner that for each determined recording position of said carriage and for said face of said insulating plate one of said members belonging to said pair makes contact with a first one of said contact surfaces whereas the other member makes contact with a second one of said contact surfaces and electrical connections connected to said members, said members of said pair being adapted for carrying electric currents when, in a recording position of said carriage, said members make contact with a said first and a said second contact surface connected together by said deposit material.

References Cited in the file of this patent
UNITED STATES PATENTS 2,734,954     Kidd _____ Feb. 14, 1956